US011965661B2

(12) United States Patent
Lee

(10) Patent No.: US 11,965,661 B2
(45) Date of Patent: Apr. 23, 2024

(54) OUTDOOR UNIT OF AIR CONDITIONER

(71) Applicant: LG ELECTRONICS INC., Seoul (KR)

(72) Inventor: Kyongdo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 17/421,784

(22) PCT Filed: Jan. 10, 2020

(86) PCT No.: PCT/KR2020/000483
§ 371 (c)(1),
(2) Date: Jul. 9, 2021

(87) PCT Pub. No.: WO2020/145731
PCT Pub. Date: Jul. 16, 2020

(65) Prior Publication Data

US 2022/0090799 A1 Mar. 24, 2022

(30) Foreign Application Priority Data

Jan. 10, 2019 (KR) ........................ 10-2019-0003228

(51) Int. Cl.
*F24F 1/22* (2011.01)
*F24F 1/10* (2011.01)
(Continued)

(52) U.S. Cl.
CPC .................. *F24F 1/22* (2013.01); *F24F 1/10* (2013.01); *F24F 1/56* (2013.01); *F24F 11/56* (2018.01);
(Continued)

(58) Field of Classification Search
CPC ...... F24F 1/22; F24F 11/56; F24F 1/10; F24F 1/56; F24F 1/0063; F24F 1/46
See application file for complete search history.

(56) References Cited

FOREIGN PATENT DOCUMENTS

CN 110362159 A * 10/2019 ............ F24F 1/0007
JP 2013-120035 6/2013
(Continued)

OTHER PUBLICATIONS

Clausen, Temperature control device, 2006, Full Document (Year: 2006).*
(Continued)

*Primary Examiner* — Nael N Babaa
(74) *Attorney, Agent, or Firm* — KED & ASSOCIATES

(57) ABSTRACT

An outdoor unit of an air conditioner may include a case that forms an outer shape of the outdoor unit; a controller that is disposed inside of the case and controls operation of various components of the air conditioner; a heat dissipation member connected to the controller to dissipate heat generated by the controller; and a support member that is coupled with the heat dissipation member to fix a position of the heat dissipation member, and having an insertion hole into which the heat dissipation member is inserted. The heat dissipation member is disposed to face the controller with respect to the support member, and at least a partial area of the heat dissipating member penetrates the insertion hole to prevent damage to a structure that dissipates heat of the controller to the outdoor unit of the air conditioner that is in contact with the controller.

14 Claims, 12 Drawing Sheets

(51) Int. Cl.

*F24F 1/56* (2011.01)
*F24F 11/56* (2018.01)
*H01Q 1/22* (2006.01)
*F24F 1/0063* (2019.01)
*F24F 1/46* (2011.01)

(52) U.S. Cl.

CPC .............. *H01Q 1/22* (2013.01); *F24F 1/0063* (2019.02); *F24F 1/46* (2013.01)

(56) References Cited

FOREIGN PATENT DOCUMENTS

| | | | |
|---|---|---|---|
| JP | 2014-127014 | 7/2014 | |
| JP | 2018-098560 | 6/2018 | |
| JP | 6417476 | 11/2018 | |
| KR | 10-1999-0041497 | 6/1999 | |
| KR | 10-2008-0040041 | 5/2008 | |
| KR | 10-2015-0080833 | 7/2015 | |
| KR | 10-2017-0003206 | 1/2017 | |
| WO | WO-2007143996 A1 * | 12/2007 | ............ F24F 1/0007 |

OTHER PUBLICATIONS

He, Laptop, 2019, Full Document (Year: 2019).*
Korean Office Action dated May 16, 2023 issued in Application No. 10-2019-0003228.
International Search Report dated May 7, 2020 issued in Application No. PCT/KR2020/000483.

* cited by examiner

OUTDOOR UNIT OF AIR CONDITIONER

CROSS-REFERENCE TO RELATED PATENT APPLICATIONS

This application is a U.S. National Stage Application under 35 U.S.C. § 371 of PCT Application No. PCT/KR2020/000483, filed Jan. 10, 2020, which claims priority to Korean Patent Application No. 10-2019-0003228 filed Jan. 10, 2019, whose entire disclosures are hereby incorporated by reference.

TECHNICAL FIELD

The present disclosure relates to an outdoor unit of an air conditioner, and more particularly, to an outdoor unit of an air conditioner having an antenna installed on one surface of a case of the outdoor unit.

BACKGROUND ART

Generally, an air conditioner is an apparatus for cooling or heating a room by using a refrigeration cycle including a compressor, an outdoor heat exchanger 30, an expansion valve, and an indoor heat exchanger. That is, it may be composed of a cooler for cooling the room and a heater for heating the room. In addition, it may be configured as a two-way air conditioner for cooling or heating the room.

Air conditioners are largely divided into a window type and a separate type (or a split type). The window type and the separate type are functionally the same. However, the window type integrates a cooling and heat dissipation function and is installed directly by punching a hole in a wall of house or by hanging the apparatus on a window. In the separate type, an indoor unit having an indoor heat exchanger is installed in the indoor side, an outdoor unit having a compressor and an outdoor heat exchanger 30 is installed in the outdoor side, and the two separated apparatuses are connected by a refrigerant pipe.

The outdoor unit of such an air conditioner is generally controlled by a remote controller. In order for the outdoor unit of the air conditioner to be controlled by the remote controller, it is preferable to perform wireless communication with the remote controller.

However, the outdoor unit according to the related art has problems in that an antenna communicating with the remote controller is exposed to the outside of the outdoor unit, so it doesn't look good, and the antenna is damaged during installation or movement of the outdoor unit.

In addition, in the outdoor unit according to the related art, when the antenna protrudes to the outside of the outdoor unit, there is a problem in that an installation location of the antenna is limited, and a larger space is required when the outdoor unit is installed.

DISCLOSURE

Technical Problem

An object of the present disclosure is to provide an outdoor unit of an air conditioner having excellent transmission/reception sensitivity without exposing an antenna for communicating with a remote control device to the outside.

Another object of the present disclosure is to provide an outdoor unit of an air conditioner that is easy to install an antenna, is easy to manufacture an antenna, and has a low probability of antenna damage.

The problems of the present disclosure are not limited to the problems mentioned above, and other problems not mentioned will be clearly understood by those skilled in the art from the following description.

Technical Solution

In order to achieve the above object, the antenna is attached to the case in a plate shape or is embedded in the case.

Specifically, the present disclosure includes a case which forms an outer shape; an antenna which transmits and receives a wireless signal and is disposed in the case, wherein the antenna includes: a base made of insulating material; and a transmission/reception member made of a conductive material disposed in the base.

The case is made of metal.

The case includes a bottom surface and an upper surface that face each other, and at least four side surfaces connecting the bottom surface and the upper surface, wherein the antenna is disposed in at least one of the side surfaces of the case.

The antenna is disposed in an upper area adjacent to the upper surface of the case in the side surface of the case.

The antenna is disposed in an inner surface of the case.

The case includes a bottom surface and an upper surface that face each other, and at least four side surfaces connecting the bottom surface and the upper surface, and the antenna is disposed in at least one of corner area connecting side surfaces of the case adjacent to each other.

The base is attached to the case.

The base is detachably coupled to the case.

The case further includes a receiving groove in which the base is accommodated.

A height of the base is less than or equal to a height of the receiving groove.

The base includes: a lower surface and an upper surface that face each other; and side surfaces which connect the upper surface and the lower surface and have a smaller area than the upper surface and the lower surface, and the lower surface is in contact with one surface of the case.

The present disclosure further includes: a compressor disposed inside the case to compress a refrigerant; an outdoor heat exchanger disposed inside the case to heat-exchange the refrigerant with outdoor air; and a discharge fan disposed inside the case to provide a flow force to air, wherein the antenna is disposed in a location horizontally overlapping with the discharge fan.

The present disclosure further includes: a communication module which is connected to the antenna and communicates with a remote controller; and a controller which controls the outdoor unit based on data transmitted from the communication module.

In addition an air conditioner of the present disclosure includes: a compressor which compresses a refrigerant; an outdoor heat exchanger which is installed outdoors and heat-exchanges the refrigerant compressed by the compressor with outdoor air; an indoor heat exchanger which is installed indoors and heat-exchanges the refrigerant compressed by the compressor with indoor air; an expansion valve which expands the refrigerant condensed in the outdoor heat exchanger or the indoor heat exchanger; and an outdoor unit which accommodates the outdoor heat exchanger and the compressor, wherein the outdoor unit includes: a case which forms an outer shape; and an antenna which transmits and receives a wireless signal and is disposed in the case, wherein the antenna includes: a base made of insulating material; and a transmission/reception member made of a conductive material disposed in the base.

Specific details of other embodiments are included in the detailed description and drawings.

Advantageous Effects

According to the outdoor unit of the air conditioner of the present disclosure, there are one or more of the following effects.

First, according to the present disclosure, since the antenna is located inside the case of the outdoor unit, there is no fear of damage when the outdoor unit is installed and the installation space of the outdoor unit is prevented from being increased.

Second, according to the present disclosure, the transmission/reception member of antenna is disposed in a base made of an insulating material, and the base is attached to the inner surface of the case, so that even if the case is made of metal, it is possible to maintain good transmission/reception sensitivity with a remote control device.

Third, the present disclosure has an advantage in that the antenna is disposed in a location that does not interfere with other components inside the case, and does not limit the size of the case and the disposition of the components in the case.

Effects of the present disclosure are not limited to the effects mentioned above, and other effects not mentioned will be clearly understood by those skilled in the art from the description of the claims.

MODE FOR INVENTION

Figure 1A:
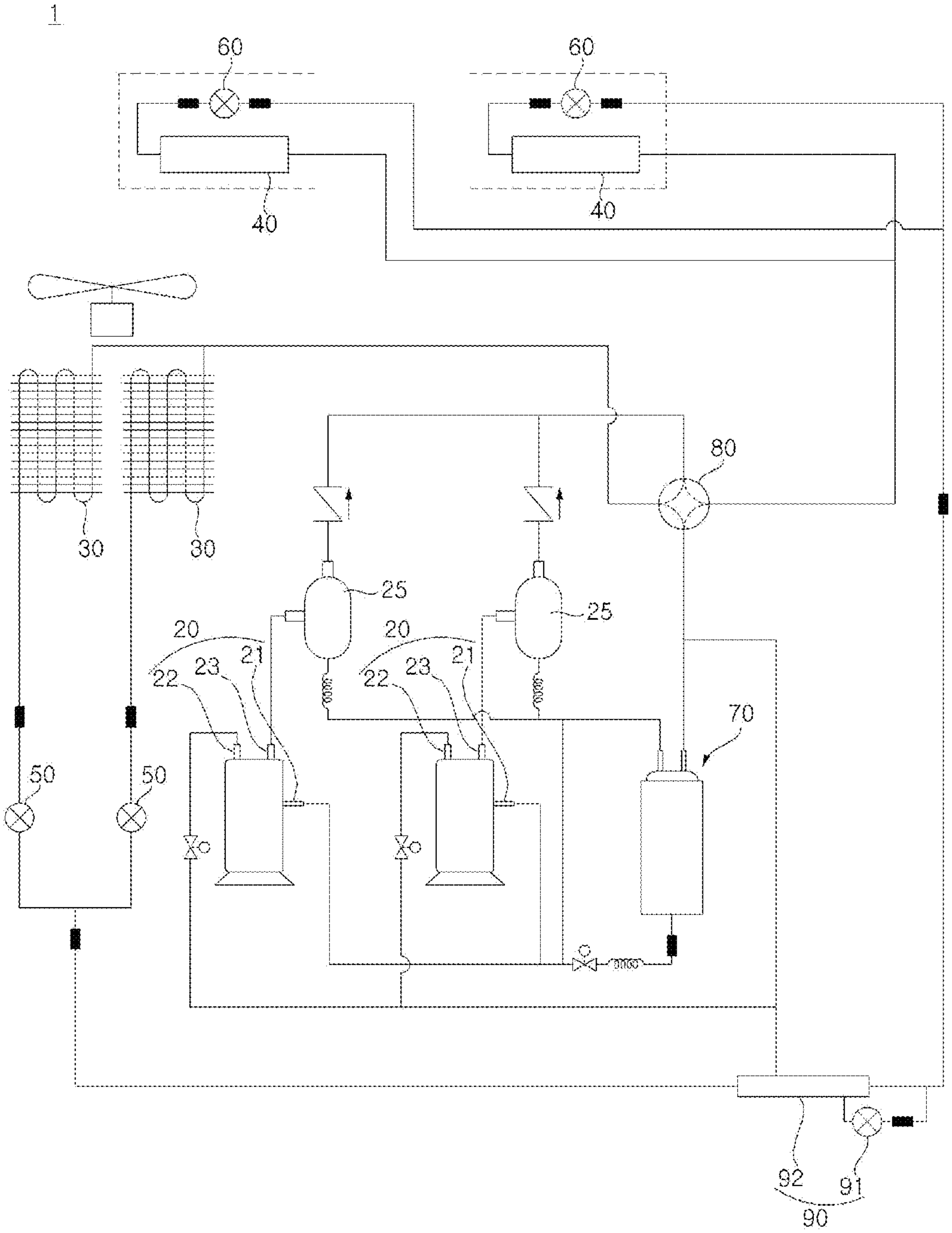
FIG. 1A is a diagram schematically illustrating a configuration of an air conditioner according to an embodiment of the present disclosure.

Advantages and features of the present invention and a method of achieving them will become apparent with reference to the embodiments described below in detail in conjunction with the accompanying drawings. However, the present invention is not limited to the embodiments disclosed below, but may be implemented in various different forms, and these embodiments just allow the disclosure of the present invention to be complete, and are provided to completely inform those of ordinary skill in the art to which the present invention pertains, of the scope of the invention, and the present invention is defined only by the scope of the claims. Like reference numerals refer to like elements throughout.

Hereinafter, the present disclosure will be described with reference to the drawings in order to explain an outdoor unit of an air conditioner according to embodiments of the present disclosure.

FIG. 1A is a diagram schematically illustrating a configuration of an air conditioner according to an embodiment of the present disclosure.

Referring to FIG. 1A, an air conditioner 1 according to the present embodiment includes a compressor 20 for compressing a refrigerant, an outdoor heat exchanger 30 installed outdoors to heat-exchange a refrigerant with outdoor air, an indoor heat exchanger 40 installed indoors to heat-exchange a refrigerant with indoor air; and a switching valve 80 for guiding the refrigerant discharged from the compressor 20 to the outdoor heat exchanger 30 during cooling operation and for guiding the indoor heat exchanger 40 during heating operation.

The air conditioner 1 includes an outdoor unit disposed outdoors and an indoor unit disposed indoors, and the indoor unit and the outdoor unit are connected to each other. The outdoor unit includes the compressor 20, the outdoor heat exchanger 30, the outdoor expansion valve 50, and a gas-liquid separator 70. The indoor unit includes the indoor heat exchanger 40 and an indoor expansion valve 60.

The air conditioner 1 includes a compressor for compressing a refrigerant, an outdoor heat exchanger installed outdoors to heat-exchange the refrigerant compressed by the compressor with outdoor air, an indoor heat exchanger installed indoors to heat-exchange the refrigerant compressed by the compressor with indoor air; and an expansion valve for expanding the refrigerant condensed in the outdoor heat exchanger or the indoor heat exchanger. Here, the expansion valve may include an indoor expansion valve and an outdoor expansion valve.

The compressor 20 is installed in the outdoor unit and compresses the introduced low-temperature and low-pressure refrigerant into high-temperature and high-pressure refrigerant. The compressor 20 may have various structures, and may be a reciprocating compressor 20 using a cylinder and a piston, a scroll compressor 20 using orbiting scroll and fixed scroll, an inverter compressor 20 which, when a desired indoor temperature is set, adjusts the amount of compression of the refrigerant based on an actual indoor temperature, an actual outdoor temperature, the number of operating indoor units, and the like. A single or a plurality of compressors 20 may be provided, and in the present embodiment, two compressors 20 are provided.

The compressor 20 is connected to a switching valve 80 and a gas-liquid separator 70. The compressor 20 includes an inlet port 21 into which the refrigerant evaporated from the indoor heat exchanger 40 flows during cooling operation or into which the refrigerant evaporated from the outdoor heat exchanger 30 flows during heating operation, and a discharge port 23 through which the compressed refrigerant is discharged.

The compressor 20 compresses the refrigerant introduced into the inlet port 21 in a compression chamber. The compressor 20 compresses the refrigerant and discharges it to the discharge port 23. The refrigerant discharged from the discharge port 23 flows to the switching valve 80.

The switching valve 80 is a flow path switching valve 80 for switching between heating and cooling, and guides the refrigerant compressed in the compressor 20 to the outdoor heat exchanger 30 during cooling operation and to the indoor heat exchanger 40 during heating operation. That is, the switching valve 80 serves to guide the refrigerant compressed in the compressor 20 to a condenser.

The switching valve 80 is connected to the discharge port 23 of the compressor 20 and the gas-liquid separator 70, and is connected to the indoor heat exchanger 40 and the outdoor heat exchanger 30. The switching valve 80 connects the discharge port 23 of the compressor 20 and the outdoor heat exchanger 30 during cooling operation, and is connected to the indoor heat exchanger 40 and the gas-liquid separator 70. However, in some embodiments, the switching valve 80 may be connected to the indoor heat exchanger 40 and the inlet port 21 of the compressor 20 during cooling operation.

The switching valve 80 connects the discharge port 23 of the compressor 20 and the indoor heat exchanger 40 during heating operation, and connects the outdoor heat exchanger 30 and the gas-liquid separator 70. However, in some embodiments, the switching valve 80 may connect the outdoor heat exchanger 30 and the inlet port 21 of the compressor 20 during a heating operation.

The switching valve 80 may be implemented as various modules that can connect different flow paths, and in the present embodiment, it is implemented as a four-way valve. However, in some embodiments, the switching valve 80 may be implemented with various valves or a combination thereof such as a combination of two three-way valves.

The outdoor heat exchanger 30 is disposed inside the outdoor unit disposed in an outdoor space, and heat-exchanges the refrigerant passing through the outdoor heat exchanger 30 with outdoor air. The outdoor heat exchanger 30 serves as a condenser for condensing refrigerant during cooling operation, and serves as an evaporator for evaporating refrigerant during heating operation.

The outdoor heat exchanger 30 is connected to the switching valve 80 and the outdoor expansion valve 50. During the cooling operation, the refrigerant which is compressed by the compressor 20 and has passed through the discharge port 23 of the compressor 20 and the switching valve 80 flows into the outdoor heat exchanger 30 and is condensed to move to the outdoor expansion valve 50. During the heating operation, the refrigerant expanded in the outdoor expansion valve 50 flows to the outdoor heat exchanger 30, then evaporates and flows to the switching valve 80.

The outdoor expansion valve 50 is fully opened during cooling operation to allow the refrigerant to pass through, and the opening degree is adjusted during the heating operation to expand the refrigerant. The outdoor expansion valve 50 is provided between the outdoor heat exchanger 30 and an injection module 90.

The outdoor expansion valve 50 passes the refrigerant flowing in from the outdoor heat exchanger 30 and guides to the injection module 90 during cooling operation. The outdoor expansion valve 50 may heat-exchange in the injection module 90 during heating operation to expand the refrigerant and guide to the outdoor heat exchanger 30.

The indoor heat exchanger 40 is disposed inside the indoor unit disposed in an indoor space, and heat-exchanges the refrigerant that passed through the indoor heat exchanger 40 with indoor air. The indoor heat exchanger 40 serves as an evaporator for evaporating refrigerant during cooling operation and as a condenser for condensing refrigerant during heating operation.

The indoor heat exchanger 40 is connected to the switching valve 80 and the indoor expansion valve 60. During cooling operation, the refrigerant expanded by the indoor expansion valve 60 flows into the indoor heat exchanger 40, and then evaporates and flows to the switching valve 80. During heating operation, the refrigerant compressed by the compressor 20 and passed through the discharge port 23 of the compressor 20 and the switching valve 80 flows into the indoor heat exchanger 40 and is condensed to flow to the indoor expansion valve 60.

The indoor expansion valve 60 expands the refrigerant by adjusting the opening degree during cooling operation, and is completely opened during heating operation to allow the refrigerant to pass through. The indoor expansion valve 60 is provided between the indoor heat exchanger 40 and the injection module 90.

The indoor expansion valve 60 expands the refrigerant flowing into the indoor heat exchanger 40 during cooling operation. The indoor expansion valve 60 passes the refrigerant flowing in from the indoor heat exchanger 40 during heating operation and guides to the injection module 90.

The injection module 90 is provided between the outdoor heat exchanger 30 and the indoor heat exchanger 40 and injects a portion of the refrigerant flowing between the outdoor heat exchanger 30 and the indoor heat exchanger 40 into the compressor 20. That is, a portion of the refrigerant flowing from the condenser 30, 40 to the expansion valve may be injected into the compressor 20. The injection module 90 is connected to the outdoor expansion valve 50 and the indoor expansion valve 60.

The injection module 90 includes an injection expansion valve 91 that expands a portion of the refrigerant flowing between the outdoor heat exchanger 30 and the indoor heat exchanger 40, and an injection heat exchanger 92 that heat-exchanges another portion of the refrigerant flowing between the indoor heat exchanger 40 and the outdoor heat exchanger 30 with the refrigerant expanded in the injection expansion valve 91. The injection heat exchanger 92 guides the refrigerant which is heat-exchanged and evaporated to an injection port 22 of the compressor 20. However, in some embodiments, the injection module 90 may not be included in a configuration of the air conditioner 1.

The gas-liquid separator 70 is provided between the switching valve 80 and the inlet port 21 of the compressor 20. The gas-liquid separator 70 is connected to the switching valve 80 and the inlet port 21 of the compressor 20. The gas-liquid separator 70 separates the gaseous refrigerant and the liquid refrigerant from the refrigerant evaporated from the indoor heat exchanger 40 during cooling operation or from the refrigerant evaporated from the outdoor heat exchanger 30 during heating operation, and guides the gaseous refrigerant to the inlet port 21 of the compressor 20. That is, the gas-liquid separator 70 separates the gaseous refrigerant and the liquid refrigerant from the refrigerant evaporated in the evaporator 30, 40, and guides the gaseous refrigerant to the inlet port 21 of the compressor 20.

In the gas-liquid separator 70, the refrigerant evaporated in the outdoor heat exchanger 30 or the indoor heat exchanger 40 is introduced through the switching valve 80. Therefore, the gas-liquid separator 70 maintains a temperature of approximately 0 to 5 degrees, and cooling heat may be emitted to the outside. The surface temperature of the gas-liquid separator 70 is lower than the temperature of the refrigerant condensed in the outdoor heat exchanger 30 during cooling operation. The gas-liquid separator 70 may have a long cylindrical shape in the length direction.

Figure 1B:
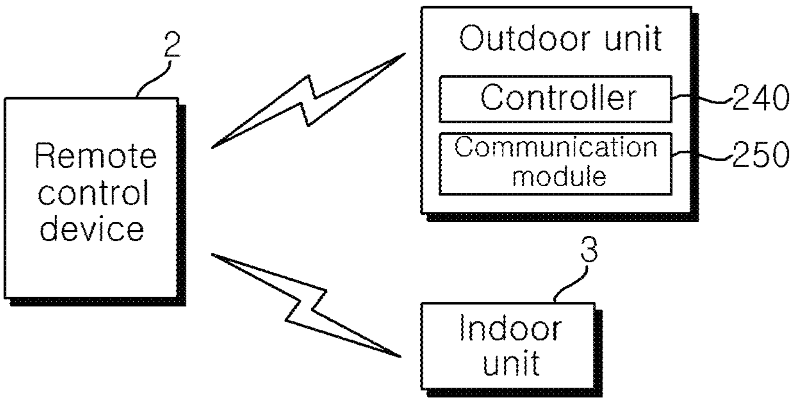
FIG. 1B is a diagram schematically illustrating a control block of an air conditioner according to an embodiment of the present disclosure.

FIG. 1B is a diagram schematically illustrating a control block of an air conditioner according to an embodiment of the present disclosure.

The outdoor unit and the indoor unit may be connected by a wired/wireless communication method of the remote control device. Obviously, the indoor unit may be connected to the outdoor unit through a wired/wireless communication method.

A remote control device 2 and the outdoor unit 1 may perform two-way communication with each other, and the communication method may use Bluetooth, which is one of short-range wireless communication methods, but is not limited thereto.

When the remote control device 2 and the outdoor unit 1 perform two-way communication with each other, each of the remote control device 2 and the outdoor unit 1 includes a communication module 250.

When receiving an input by user's manipulation, the remote control device 2 transmits a corresponding signal to the outdoor unit 1 using the communication module 250. The controller of the outdoor unit controls the outdoor unit according to a control command of the remote control device.

The remote control device 2 may include a mobile terminal or a remote controller in which software for controlling the outdoor unit 1 is installed.

The outdoor unit 1 is provided with a communication module 190 for communication with the remote control device 2. The communication module 190 may be a communication module using a Bluetooth low energy standard like the communication standard used by the remote control device 2.

The outdoor unit 1 will be described in more detail below.

Figure 2:
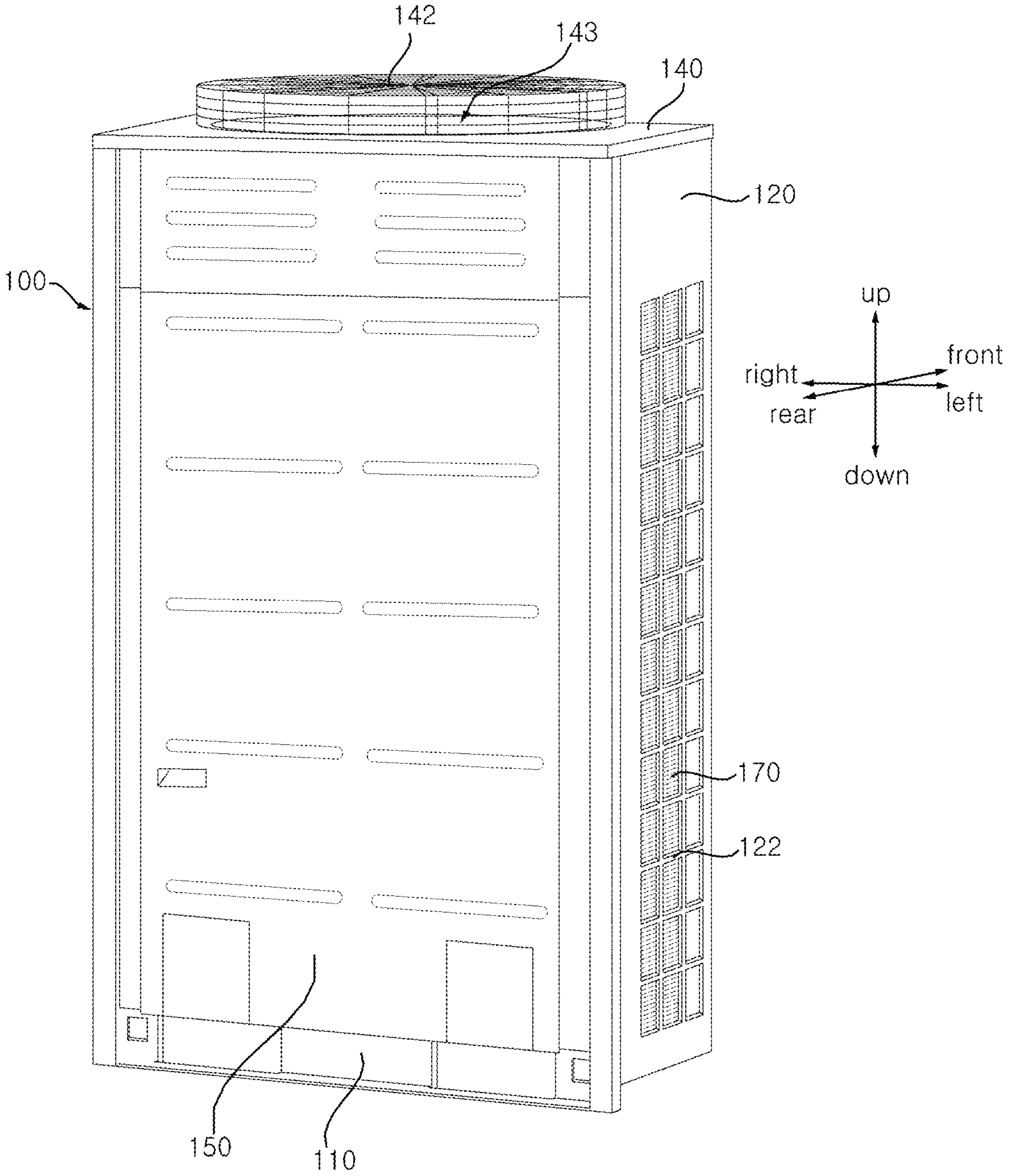
FIG. 2 is a perspective view illustrating an outdoor unit of an air conditioner according to an embodiment of the present disclosure.
Figure 3:
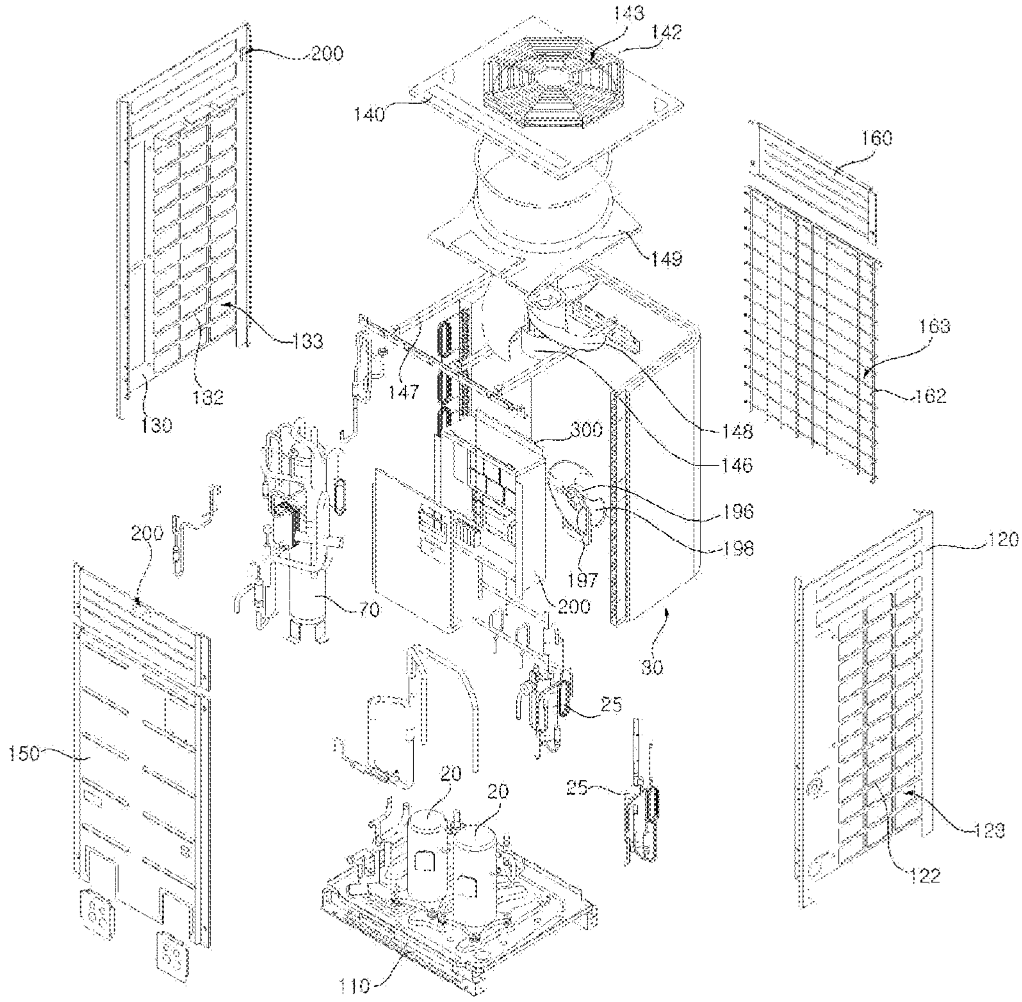
FIG. 3 is an exploded perspective view illustrating an outdoor unit of an air conditioner according to an embodiment of the present disclosure.

FIG. 2 is a perspective view illustrating an outdoor unit of an air conditioner according to an embodiment of the present disclosure. FIG. 3 is an exploded perspective view illustrating an outdoor unit of an air conditioner according to an embodiment of the present disclosure.

Referring to FIGS. 2 and 3, the outdoor unit of the air conditioner 1 of the present embodiment includes an outdoor unit bottom part 110 forming a bottom surface, an outdoor unit main body 100 which is coupled to the outdoor unit bottom part 110, has a suction hole which is formed on a circumferential surface and sucks air, and has a discharge hole 143 formed on an upper surface, an outdoor heat exchanger 30 disposed in the outdoor unit main body 100 to correspond to an inlet port, a discharge fan 148 which is provided in the discharge hole 143 of the outdoor unit main body 100 and flows air in a vertical direction, and a suction fan 198 which is provided in a lower part of the outdoor unit main body 100 and flows air in a horizontal direction.

In the present embodiment, an up-down direction refers to a vertical direction that is the direction of gravity, and the front-rear direction and the left-right direction are a horizontal direction perpendicular to the vertical direction.

A case includes the outdoor unit bottom part 110 and the outdoor unit main body 100 to form an outer shape of the outdoor unit. The outdoor unit bottom part 110 forms an outer shape of the bottom surface of the case, and the compressor 20, the oil separator 25, the gas-liquid separator 70, the outdoor heat exchanger 30, and the like are installed on an upper surface.

The outdoor unit main body 100 is coupled to the outdoor unit bottom surface part 110. The outdoor unit main body 100 is formed as a rectangular parallelepiped with an open lower surface. The outdoor unit main body 100 has a suction hole which is formed in a circumferential surface, and through which air is sucked. A discharge hole 143 is formed in the upper surface of the outdoor unit main body 100. The suction hole is preferably formed in three surfaces among the circumferential surface of the outdoor unit main body 100, and is preferably formed in a rear surface, a left surface, and a right surface of the outdoor unit main body 100. In the present embodiment, the suction hole includes a left suction hole 123, a right suction hole 133, and a rear suction hole 163.

The outdoor unit main body 100 includes a left panel 120 forming a left side surface, a right panel 130 forming a right side surface, a top panel 140 forming an upper surface, a front panel 150 forming a front surface, and a rear panel 160 forming a rear surface.

The left panel 120 forms the outer shape of the left side surface of the outdoor unit, and is coupled to the left side of the outdoor unit bottom surface part 110. A right grill 122 is provided in the left panel 120 so that outdoor air can be sucked into the outdoor unit main body 100. The right grill 122 forms a left suction port through which outdoor air is sucked from the left side.

The right panel 130 forms an outer shape of the right side surface of the outdoor unit, and is coupled to the right side of the outdoor unit bottom surface part 110. A right grill 132 is provided in the right panel 130 so that outdoor air can be sucked into the outdoor unit main body 100. The right grill 132 forms a right suction hole 133 through which outdoor air is sucked from the right side.

The top panel 140 forms an outer shape of the upper surface of the outdoor unit, is coupled to the upper side of the left panel 120 and the right panel 130, and has a discharge hole 143. The top panel 140 may be provided with a discharge grill located in the upper side of the discharge hole 143.

The front panel 150 forms an outer shape of the front surface of the outdoor unit, and is disposed in the front between the outdoor unit bottom surface part 110, the left panel 120, the right panel 130, and the top panel 140.

The rear panel 160 forms an outer shape of the rear surface of the outdoor unit and is disposed in a rear between the left panel 120, the right panel 130, and the top panel 140. The rear panel 160 is provided with a rear grill 162 so that outdoor air can be sucked into the outdoor unit main body 100. The rear grill 162 forms a rear suction hole 163 through which outdoor air is sucked from the rear.

The outdoor heat exchanger 30 is disposed inside the outdoor unit main body 100 to correspond to the suction hole. In the present embodiment, since the suction hole is formed of a left suction hole 123, a right suction hole 133, and a rear suction hole 163, the outdoor heat exchanger 30 is formed in three surfaces by bending a horizontal cross section in a ⊃ shape. The outdoor heat exchanger 30 formed in three surfaces is disposed to surround the compressor 20, the oil separator 25, and the gas-liquid separator 70 installed in the upper surface of the outdoor unit bottom surface part 110.

Among the three surfaces of the outdoor heat exchanger 30, the left side surface is disposed to correspond to the left suction hole 123 formed in the right grill 122, the right side surface is disposed to correspond to the right suction hole 133 formed in the right grill 132, and the rear surface, which is a middle surface, is disposed to correspond to the rear suction hole 163 formed in the rear grill 162.

The discharge fan 148 is provided in the discharge hole 143 of the outdoor unit main body to flow air in a vertical direction. The discharge fan 148 is disposed in the lower side of the top panel to correspond to the discharge hole 143. The discharge fan 148 is supported by the discharge bracket 147 connected to the front panel 150 and the rear panel 160.

The discharge fan 148 is rotated by a discharge motor 146, and the discharge motor 146 is installed in the discharge bracket 147. An orifice 149 forming a flow path is provided around the discharge fan 148. The orifice 149 is connected to the front panel 150 and the rear panel 160 and is disposed below the top panel 140.

The discharge fan 148 flows the outdoor air so that the outdoor air and the refrigerant exchange heat in the outdoor heat exchanger 30. The discharge fan 148 is preferably an axial flow fan whose shaft is formed in a vertical direction (up-down direction) to discharge the outdoor air inside the outdoor unit main body 100 to the outside. The discharge fan 148 discharges an external air sucked into the suction hole 123, 133, and 163 upward.

The suction fan 198 is provided in a lower portion of the outdoor unit main body 100 and flows air in the horizontal direction. The suction fan 198 is disposed above the outdoor unit bottom surface part 110. The suction fan 198 is supported by the suction bracket 197 connected to the upper surface of the outdoor unit bottom surface part 110. The suction fan 198 is rotated by the suction motor 196, and the suction motor 196 is installed in the suction bracket 197.

The suction fan 198 flows the outdoor air together with a blower 200 so that the outdoor air and the refrigerant exchange heat in the outdoor heat exchanger 30. Therefore, the efficiency of the air conditioner is enhanced during cooling/heating operation when both the discharge fan 148 and the suction fan 198 flow outdoor air, rather than generating heat exchange in the outdoor heat exchanger 30 by flowing outdoor air only through the discharge fan 148 without the suction fan 198.

The suction fan 198 is preferably an axial flow fan whose shaft is formed in a horizontal direction to suck the outdoor air from the outside of the outdoor unit main body 100 into the inside. The suction fan 198 preferably has a shaft formed in the front-rear direction to flow air in the front-rear direction.

The controller 240 is a part that controls the compressor 20, the outdoor expansion valve 50, the indoor expansion valve 60, the switching valve 80, the suction motor 196, and the discharge motor 146, and the like according to the heating-cooling performance requirements.

Figure 4:
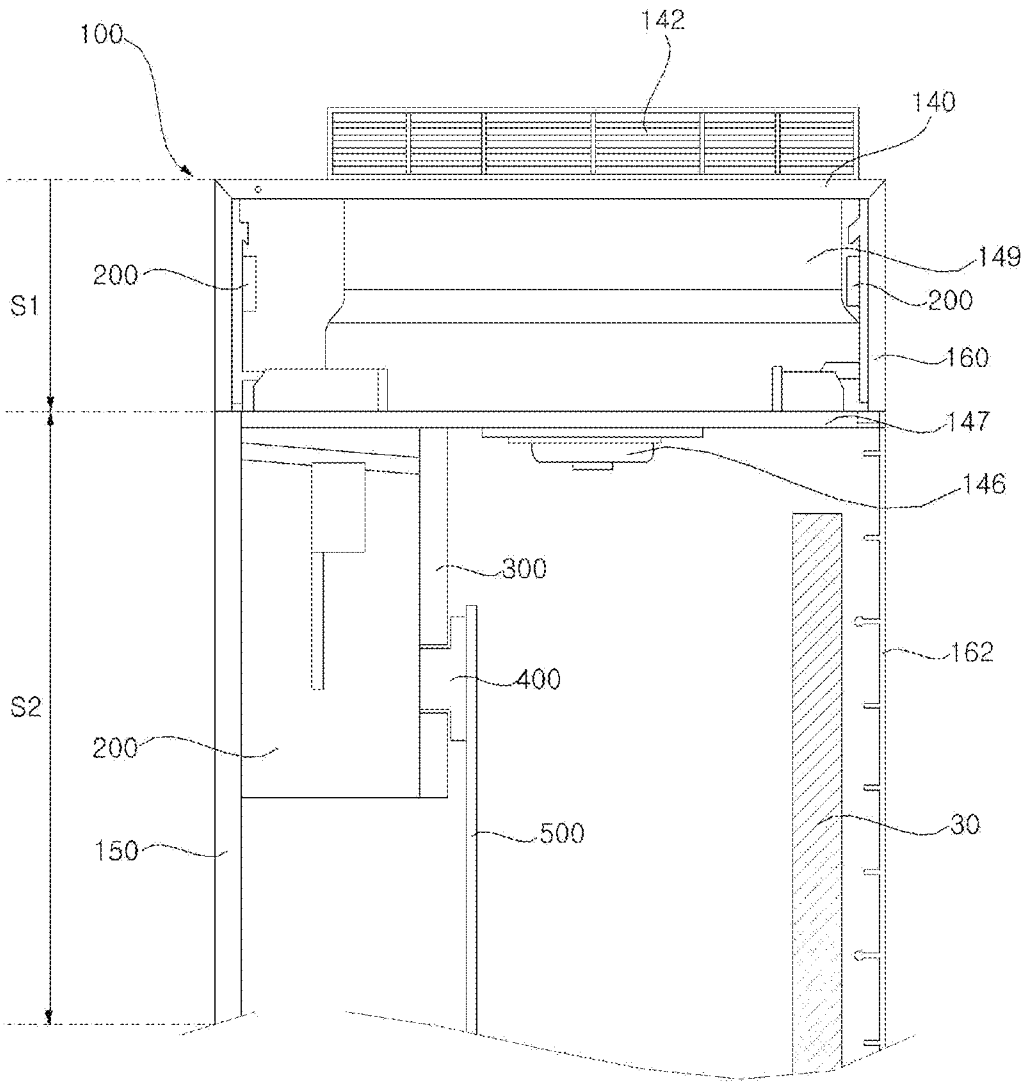
FIG. 4 is a side cross-sectional view of an outdoor unit of an air conditioner according to an embodiment of the present disclosure.
Figure 5:
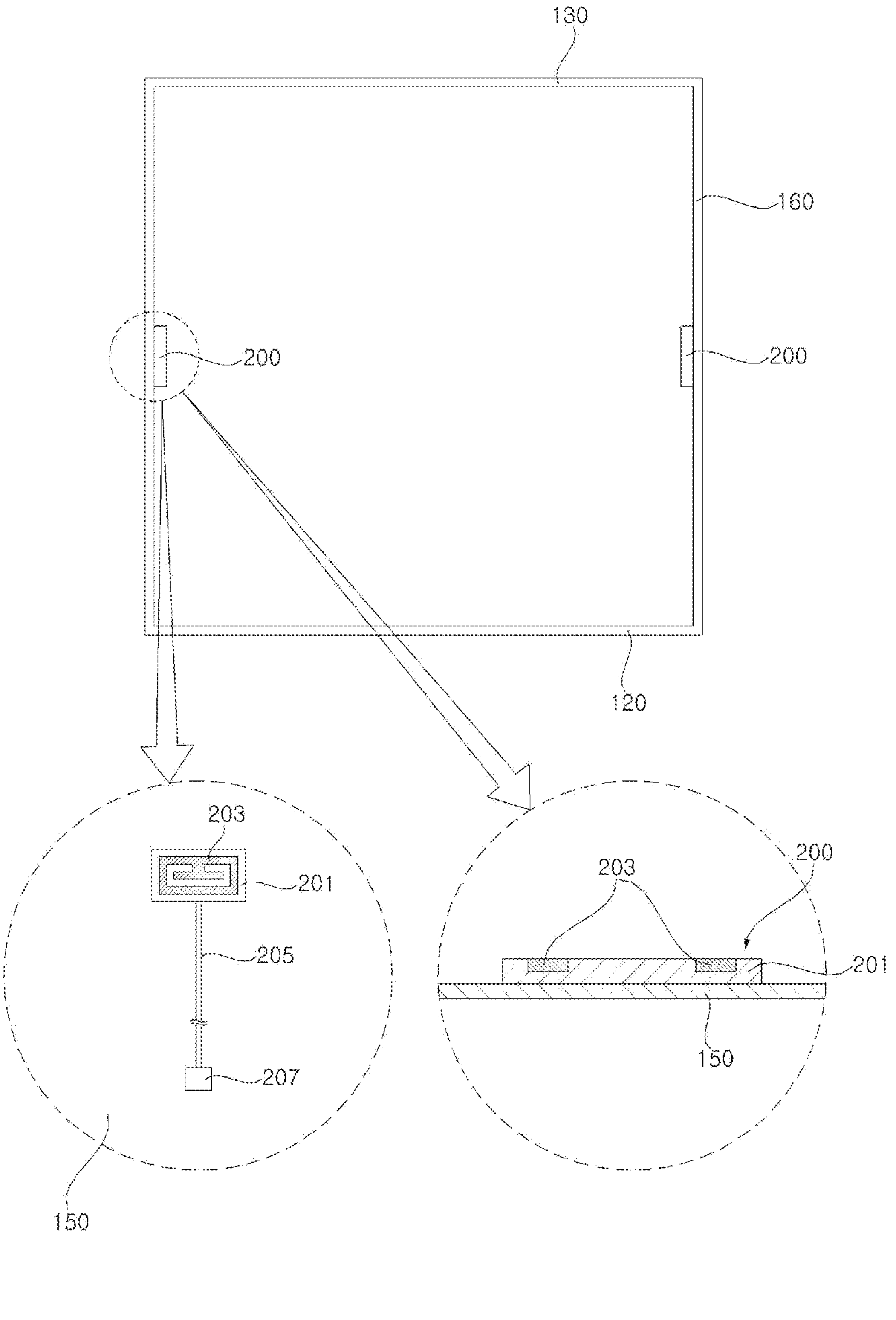
FIG. 5 is a plan cross-sectional view illustrating a dislocation of an outdoor unit and antenna according to an embodiment of the present disclosure.

FIG. 4 is a side cross-sectional view of an outdoor unit of an air conditioner according to an embodiment of the present disclosure. FIG. 5 is a plan cross-sectional view illustrating a dislocation of an outdoor unit and antenna according to an embodiment of the present disclosure.

Referring to FIGS. 4 and 5, a discharge bracket 147 connecting the front panel 150 and the rear panel 160 is installed between the front panel 150 and the rear panel 160. The discharge bracket 147 partitions the inside of the outdoor unit (case) into an upper space and a lower space. That is, a lower side where the compressor 20, the outdoor heat exchanger 30, the suction fan 198, and the controller 240 are installed and an upper side where the orifice and the discharge fan 148 are installed are partitioned.

The present disclosure may further include an antenna 200 for transmitting and receiving a wireless signal between the remote control device 2 and the outdoor unit.

The case of the outdoor unit includes a metal material for rigidity. When the antenna 200 is in direct contact with the case, a space occupied by the antenna 200 can be reduced, but an obstacle occurs in transmission and reception of radio waves. Accordingly, the antenna 200 of the embodiment can be easily installed in the case of the outdoor unit while improving the transmission/reception efficiency of radio waves.

For example, the antenna 200 may include a base 201 made of an insulating material; and a transmission/reception member 203 made of a conductive material disposed in the base 201.

The base 201 is an insulating material, defines a space in which the transmission/reception member 203 is disposed, insulates the transmission/reception member 203 from the case, and serves to install the transmission/reception member 203 in the case. For the base 201, various materials of an insulating material may be selected. The base 201 preferably includes a synthetic resin.

The base 201 may be attached to the case, or the base 201 may be detachably coupled to the case. Specifically, the base 201 includes a lower surface and an upper surface facing each other, and side surfaces that connect the upper and lower surfaces and have a smaller area than the upper and lower surfaces, and the lower surface may be in contact with one surface of the case.

Therefore, when the base 201 has a low height and the widest surface is in contact with the case, the height at which the antenna 200 protrudes from one surface of the case is reduced, thereby reducing interference with other components, and having an excellent adhesive force as the contact area is large. More specifically, the lower surface of the base 201 may be adhered to one surface of the case by an adhesive.

The transmission/reception member 203 serves to emit an AC voltage modulated by the transmitter in the air as an electromagnetic wave when transmitting, and to convert the electromagnetic wave into an AC voltage evaluated by the receiver when receiving.

The transmission/reception member 203 may include a conductive material. For example, it may include at least one of Ag, Au, Cu, and Al.

The transmission/reception member 203 is connected to a communication module. Specifically, the transmission/reception member 203 may be connected to the communication module by a cable 205 and a connector 207.

The transmission/reception member 203 may have various patterns and may be disposed in the upper surface of the base 201. For example, the transmission/reception member 203 may be disposed in the upper surface of the base 201 in a film shape, or may be inserted from the upper surface of the base 201 to the lower portion. In addition, the upper surface of the transmission/reception member 203 may protrude higher than the upper surface of the base 201, be located at the same height as the upper surface of the base 201, or located lower than the upper surface of the base 201.

When the antenna 200 is disposed outside the outdoor unit, it may be damaged due to environmental changes of the outdoor unit, may be damaged during installation of the outdoor unit, or may be intentionally damaged by other user. Therefore, it is preferable to be installed inside the case.

For example, the case may include a bottom surface and an upper surface that face each other, and at least four side surfaces connecting the bottom surface and the upper surface, and the antenna 200 may be disposed in at least one of the side surfaces of the case.

Specifically, the antenna 200 may be disposed in at least one of the front panel 150, the rear panel 160, the left panel 120, and the right panel 130. Preferably, the antenna 200 may be disposed in at least two of the front panel 150, the rear panel 160, the left panel 120, and the right panel 130. More preferably, the antenna 200 may be disposed in the front panel 150 and the rear panel 160 facing each other respectively, or disposed in the left panel 120 and the right panel 130 respectively, to maximize the radio wave transmission/reception efficiency.

In addition, the antenna 200 is disposed in an inner surface of the case. Here, the inner surface of the case is a surface facing the inside of the case among the side surfaces of the case. Specifically, the antenna 200 may be disposed in at least one of an inner surface of the front panel 150, an inner surface of the rear panel 160, an inner surface of the left panel 120, and an inner surface of the right panel 130.

The case is divided into an upper area S1 in which the discharge fan 148 and the orifice 149 are disposed, and a lower area S2 which is disposed in a lower portion of the upper area S1, and in which the compressor, the controller, the outdoor heat exchanger, the refrigerant pipe are disposed.

The upper area S1 and the lower area S2 may be divided by the discharge bracket 147. Several components are disposed in the lower area S2. In particular, since the outdoor heat exchanger is disposed along the side surface of the case, there is no space to install the antenna 200, and even if there is a space to install the antenna 200, there is insufficient space to work for installing the antenna 200.

In the case of the upper area S1, since a circular orifice 149 is disposed inside the rectangular case, a sufficient space exists between the orifice 149 and the side surface of the case. Accordingly, the antenna 200 may be disposed in the upper area S1 adjacent to the upper surface of the case in the side surface of the case. Accordingly, the antenna 200 may be disposed in the upper area S1 adjacent to the upper surface of the case in the side surface of the case. In addition, the antenna 200 may be disposed in a location that horizontally overlaps with the discharge fan.

Figure 8:
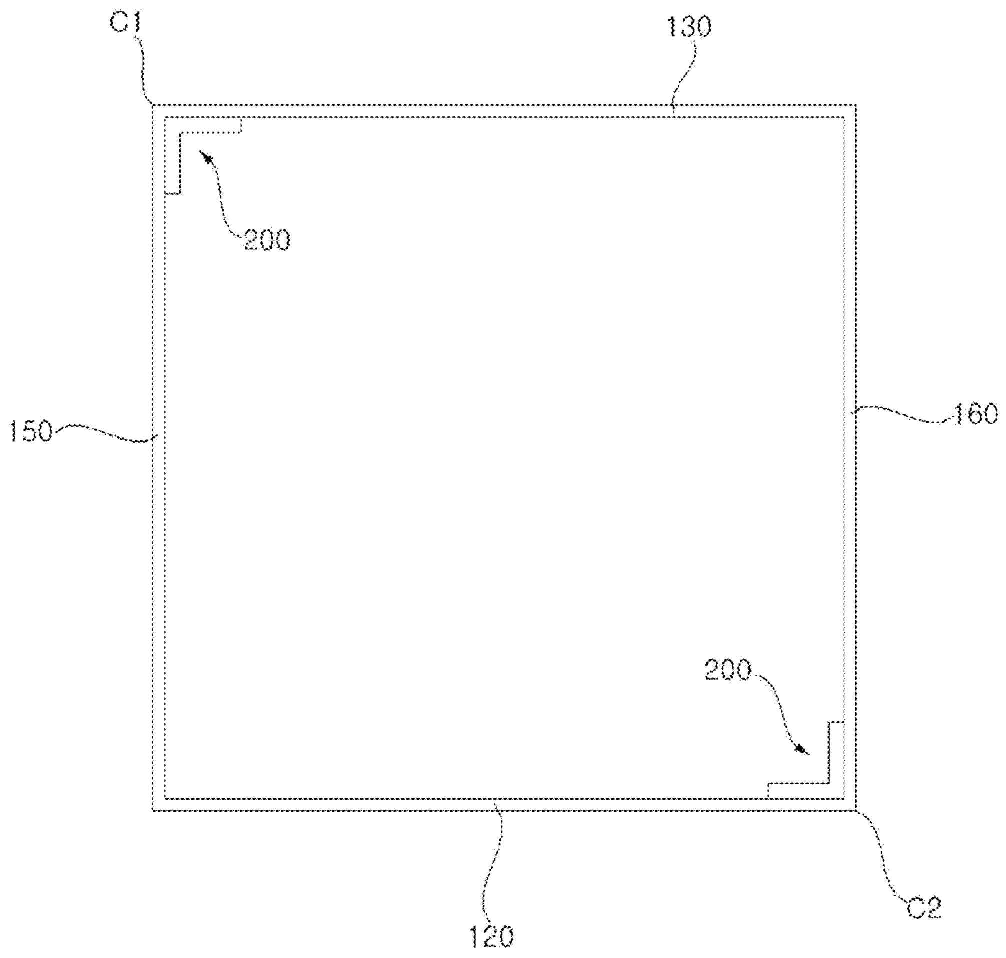
FIG. 8 is a diagram illustrating a coupling of an outdoor unit and an antenna according to another embodiment of the present disclosure.

Obviously, the antenna 200 may be located at the center or both ends of one surface of each case in the upper area S1. Preferably, as shown in FIG. 8, the antenna 200 may be disposed in a corner where the largest space is formed between the orifice 149 and one side surface of the case. This will be described later.

The controller 240 is disposed inside the case and may control the operation of various components of the air conditioner. The controller 240 may be disposed in various locations inside the case according to the performance and type of the air conditioner. The controller 240 may be installed in the middle portion of the case in combination with at least one of the front panel 150, the right panel 130, and the left panel 120 of the case. In the present embodiment, the controller 240 is installed in the middle portion of the front panel 150. In addition, the controller 240 may be bolted to be detachably coupled to the case. The controller 240 is connected to a heat dissipation member 400 to dissipate heat generated by the controller 240 and prevents the temperature of the controller 240 from increasing. In the present embodiment, the heat dissipation member 400 is connected to the rear of the controller 240.

In the controller 240, a support member 300 may be detachably coupled to one side to which the heat dissipation member 400 is connected. Accordingly, when a failure of the controller 240 occurs, it may be easy to separate the controller 240 from the support member 300.

A control box 220 forms an outer shape of the controller 240, and forms a space in which components such as a printed circuit board are accommodated.

The heat dissipation member 400 is connected to the controller 240 to dissipate heat generated by the controller 240. In detail, the heat dissipation member 400 is connected to the printed circuit board 210 provided inside the control box 220 through a connection hole 221 of the control box 220. Accordingly, the printed circuit board 210 is cooled by dissipating heat generated by a power device provided in the printed circuit board 210. Accordingly, the power device provided in the printed circuit board 210 may be maintained at an operable temperature.

The heat dissipation member 400 is disposed to face the controller 240 with respect to the support member 300.

A partial area of the heat dissipation member 400 may penetrate the insertion hole 310 and be in contact with the controller 240.

Specifically, the heat dissipation member 400 includes a contact portion 410 in contact with the controller 240 (specifically, the printed circuit board 210) and a coupling portion 420 coupled to the support member 300.

The heat dissipation member 400 may have one side to which the controller 240 is detachably coupled, and have the other side, which is opposite to the one side, to which the refrigerant pipe 500 through which the refrigerant flows may be coupled. In the present embodiment, the heat dissipation member 400 has a front side to which the controller 240 is coupled, and has a rear side to which the refrigerant pipe 500 is coupled.

The refrigerant pipe 500 is coupled to the rear portion of the heat dissipation member 400. A refrigerant that bypassed a portion of the refrigerant that has passed through the outdoor heat exchanger 30 or the indoor heat exchanger flows through the refrigerant pipe 500. The refrigerant pipe 500 is formed in a U shape. Accordingly, the refrigerant flowing in the refrigerant pipe 500 can absorb heat once while flowing upward, and can absorb heat once again while flowing downward, thereby increasing heat dissipation efficiency.

The support member 300 is coupled to the heat dissipation member 400 to fix the location of the heat dissipation member 400. The support member 300 is disposed inside the case, and is disposed in a place corresponding to the location of the controller 240. The support member 300 may be formed in a long plate shape in the length direction. The support member 300 may be installed in the case by having an upper portion coupled to the discharge bracket 147 or a side surface portion coupled to at least one of the right panel 130 and the left panel 120. In the present embodiment, the support member 300 is installed in the middle portion of the case together with the controller 240.

Figure 6:
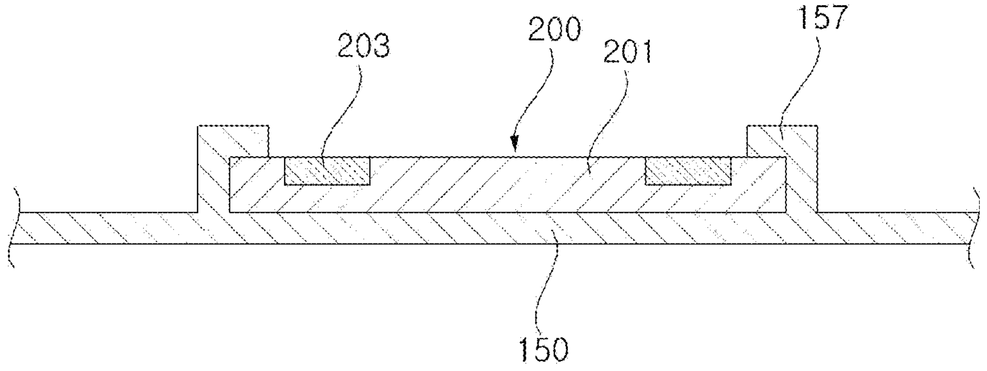
FIG. 6 is a diagram illustrating a coupling of an outdoor unit and an antenna according to another embodiment of the present disclosure.

FIG. 6 is a diagram illustrating a dislocation of an outdoor unit and an antenna 200 according to another embodiment of the present disclosure.

Referring to FIG. 6, the embodiment of FIG. 8 has a difference in the method of coupling the antenna 200 in comparison with the embodiment of FIG. 5.

In an embodiment, the antenna 200 may be coupled to a case by the coupling member 157 installed in the case. Obviously, the antenna 200 may be detachably coupled to the case.

For example, the coupling member 157 may have a shape having a space in which the edge of the base 201 can be press-fitted. Another example may be a fastening screw.

Figure 7:
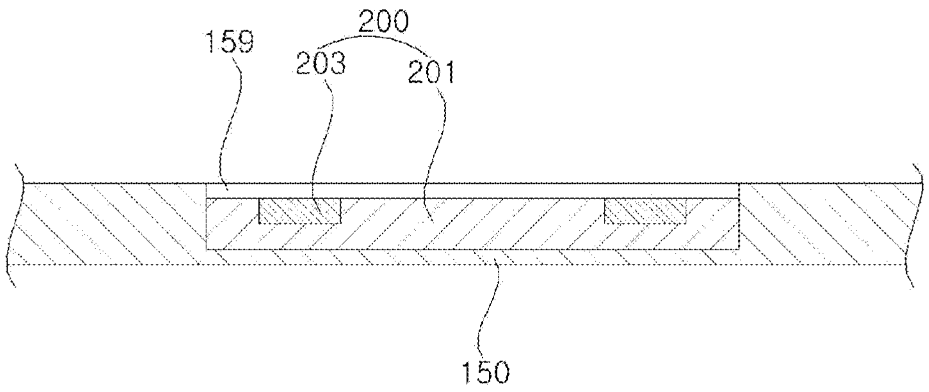
FIG. 7 is a diagram illustrating a coupling of an outdoor unit and an antenna according to another embodiment of the present disclosure.

FIG. 7 is a diagram illustrating a coupling of an outdoor unit and an antenna 200 according to another embodiment of the present disclosure.

Referring to FIG. 7, the embodiment of FIG. 6 has a difference in the location of the antenna 200 in comparison with the embodiment of FIG. 5.

The case may further include a receiving groove 159 in which the base 201 is accommodated. The receiving groove 159 guides the installation location of the antenna 200, prevents the antenna 200 from being separated from the case, and prevents interference between the antenna 200 and other components.

A lower surface and a side surface of the base 201 may be adhered to the receiving groove 159. The height of the base 201 may be equal to or smaller than the height of the receiving groove 159. Preferably, the upper surface of the base 201 may be located lower than the upper surface of one surface of the case.

FIG. 8 is a diagram illustrating a coupling of an outdoor unit and an antenna 200 according to another embodiment of the present disclosure.

Referring to FIG. 8, the embodiment of FIG. 8 has a difference in the location of the antenna 200 in comparison with the embodiment of FIG. 5.

In the antenna 200 of the embodiment, the antenna 200 may be disposed in at least one of the corner areas connecting the side surfaces of the case adjacent to each other. Specifically, the antenna 200 may be disposed in a corner C1 where the front panel 150 and the right panel 130 meet and a corner C2 where the left panel 120 and the rear panel 160 meet.

At this time, the antenna 200 may be formed to be round or bent to correspond to the shape of the corner.

Figure 9:
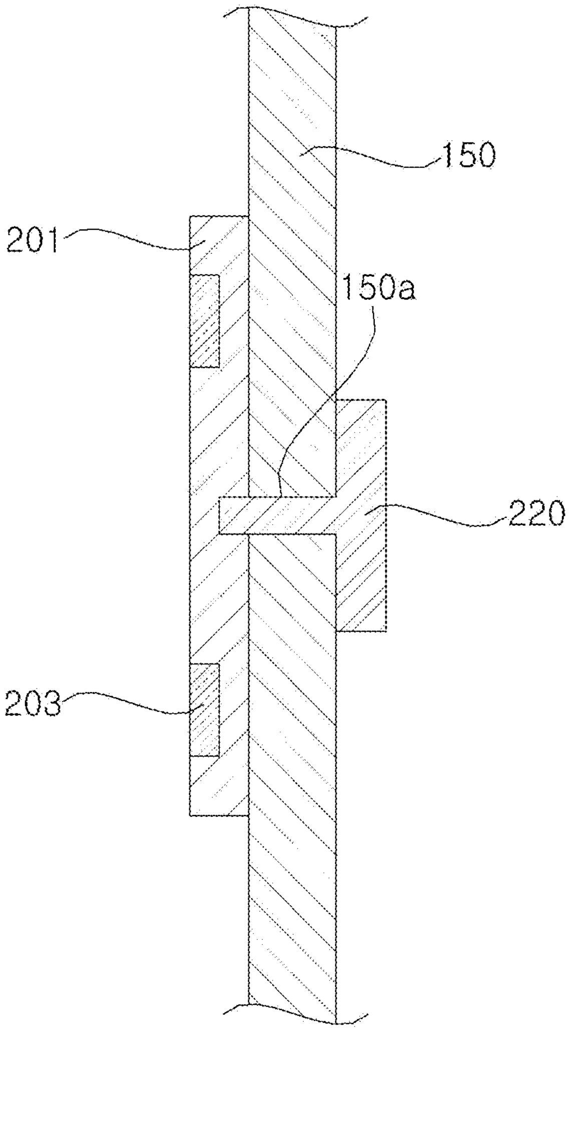
FIG. 9 is a diagram illustrating a coupling of an outdoor unit and an antenna according to another embodiment of the present disclosure.
Figure 10:
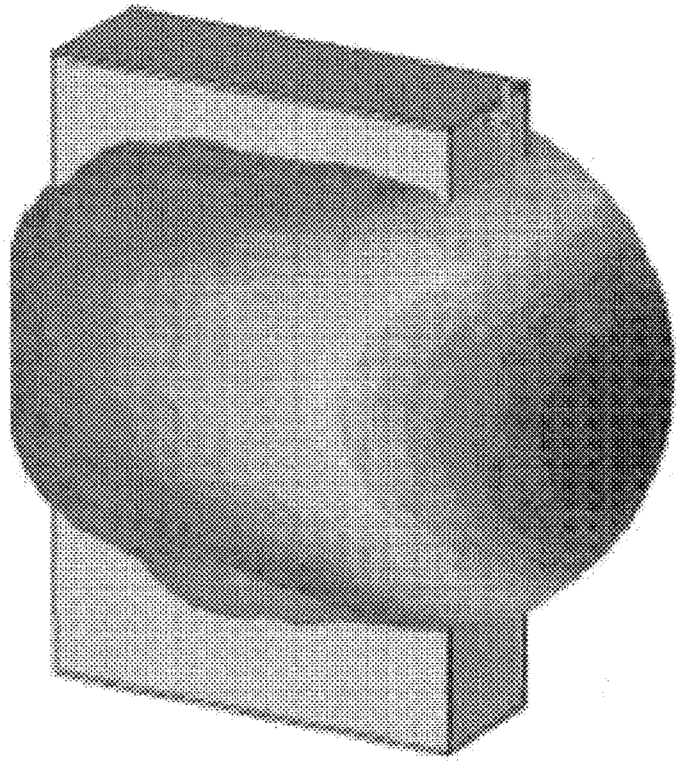
FIG. 10 is a diagram illustrating an emitting pattern of an antenna according to a related art.
Figure 11:
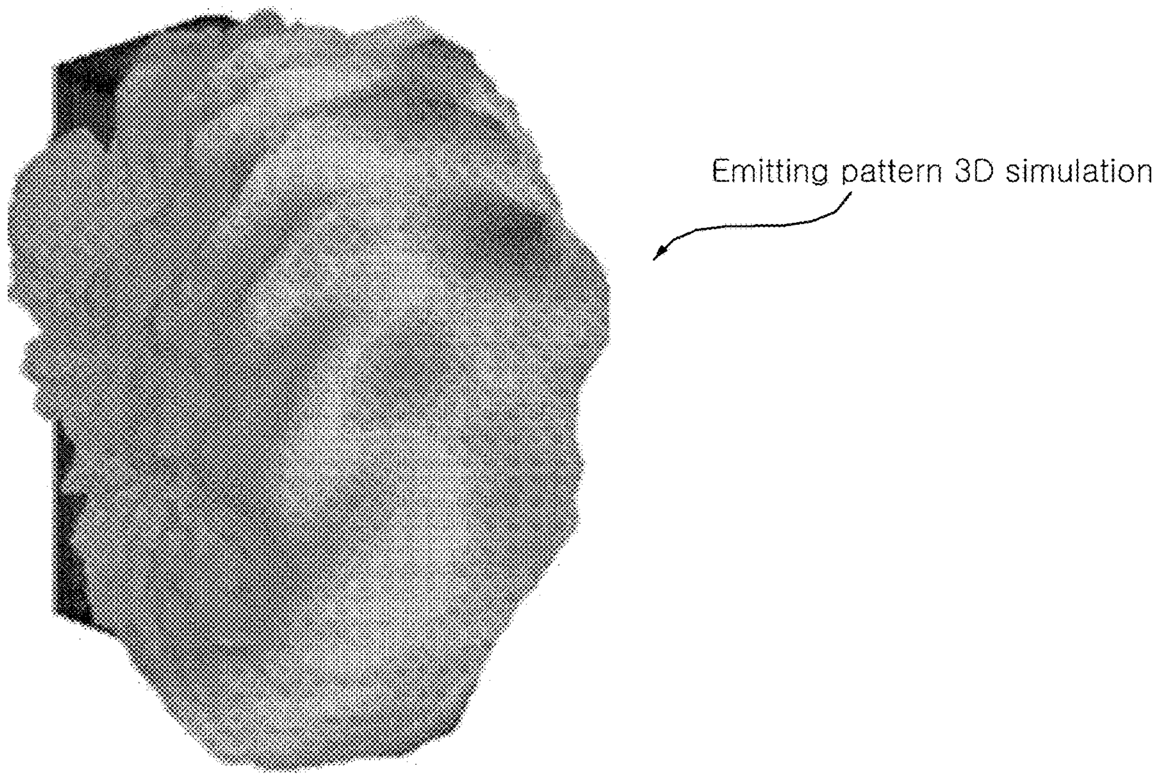
FIG. 11 is a diagram illustrating an emitting pattern of an antenna according to the present disclosure.

FIG. 9 is a diagram illustrating a coupling of an outdoor unit and an antenna 200 according to another embodiment of the present disclosure.

Referring to FIG. 9, the embodiment of FIG. 9 has a difference in a coupling method in comparison with the embodiment of FIG. 5.

The antenna 200 of the embodiment may be fastened to one surface of the case through a screw 220. Specifically, the screw 220 may be screwed to the lower surface of the base 201 by passing through a screw hole 150*a* formed in one surface of the case. The antenna 200 may be located inside the case, and a part of the screw 220 may be exposed to the outside of the case.

While the present invention has been particularly shown and described with reference to exemplary embodiments thereof, it will be understood by those of ordinary skill in the art that various changes in form and detail may be made herein without departing from the spirit and scope of the present invention as defined by the following claims and such modifications and variations should not be understood individually from the technical idea or aspect of the present invention.

The invention claimed is:

1. An outdoor unit of an air conditioner, comprising:
- a case that forms an outer shape of the outdoor unit;
- an antenna that transmits and receives a wireless signal and is disposed in the case, wherein the antenna comprises:
  - a base made of an insulating material; and
  - a transmission/reception member made of a conductive material disposed in the base, wherein the case comprises a receiving groove in which the base is accommodated, wherein a height of the base is less than or equal to a height of the receiving groove, wherein the base comprises a lower surface and an upper surface that face each other, and side surfaces that connect the upper surface and the lower surface and having a smaller area than the upper surface and the lower surface, and wherein the lower surface and at least one of the side surfaces of the base are adhered to the receiving groove.

2. The outdoor unit of claim 1, wherein the case is made of metal.

3. The outdoor unit of claim 1, wherein the case comprises a bottom surface and an upper surface that face each other, and at least four side surfaces that connect the bottom surface and the upper surface, and wherein the antenna is disposed in at least one of the side surfaces of the case.

4. The outdoor unit of claim 3, wherein the antenna is disposed in an upper area adjacent to the upper surface of the case in the at least one of the side surfaces of the case.

5. The outdoor unit of claim 3, wherein the antenna is disposed in an inner surface of the case.

6. The outdoor unit of claim 1, wherein the case comprises a bottom surface and an upper surface that face each other, and at least four side surfaces that connect the bottom surface and the upper surface.

7. The outdoor unit of claim 1, wherein the lower surface of the base is in contact with one surface of the case.

8. The outdoor unit of claim 1, further comprising:
- a compressor that is disposed inside of the case and compresses a refrigerant;
- an outdoor heat exchanger that is disposed inside of the case and heat-exchanges the refrigerant with outdoor air; and
- a discharge fan that is disposed inside of the case and provides a flow force to air, wherein the antenna is disposed in a location horizontally overlapping with the discharge fan.

9. The outdoor unit of claim 1, further comprising:
- a communication module that is connected to the antenna and communicates with a remote controller; and
- a controller that controls the outdoor unit based on data transmitted from the communication module.

10. An air conditioner comprising:
- a compressor that compresses a refrigerant;
- an outdoor heat exchanger that is installed outdoors and heat-exchanges the refrigerant compressed by the compressor with outdoor air;
- an indoor heat exchanger that is installed indoors and heat-exchanges the refrigerant compressed by the compressor with indoor air;
- an expansion valve that expands the refrigerant condensed in the outdoor heat exchanger or the indoor heat exchanger; and
- an outdoor unit that accommodates the outdoor heat exchanger and the compressor, wherein the outdoor unit comprises:
  - a case that forms an outer shape of the outdoor unit; and
  - an antenna that transmits and receives a wireless signal and is disposed in the case, wherein the antenna comprises:
    - a base made of an insulating material; and
    - a transmission/reception member made of a conductive material disposed in the base, wherein the case comprises a receiving groove in which the base is accommodated, wherein a height of the base is less than or equal to a height of the receiving groove, wherein the base comprises a lower surface and an upper surface that face each other, and side surfaces that connect the upper surface and the lower surface and having a smaller area than the upper surface and the lower surface, and wherein the lower surface and at least one of the side surfaces of the base are adhered to the receiving groove.

11. The air conditioner of claim 10, wherein the case is made of metal.

12. The air conditioner of claim 10, wherein the case comprises a bottom surface and an upper surface that face each other, and at least four side surfaces that connect the bottom surface and the upper surface, and wherein the antenna is disposed in at least one of the side surfaces of the case.

13. The air conditioner of claim 12, wherein the antenna is disposed in an upper area adjacent to an upper surface of the case in the at least one of the side surfaces of the case.

14. The air conditioner of claim 12, wherein the antenna is disposed in an inner surface of the case.

* * * * *